United States Patent
Jovanovic et al.

(10) Patent No.: US 11,837,955 B2
(45) Date of Patent: Dec. 5, 2023

(54) BIAS GENERATION FOR POWER CONVERTER CONTROL

(71) Applicant: Apple Inc., Cupertino, CA (US)

(72) Inventors: Nikola Jovanovic, Munich (DE); Michael Couleur, Rottach-Egern (DE); Bhanupriya Suresh, Munich (DE)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 17/397,781

(22) Filed: Aug. 9, 2021

(65) Prior Publication Data

US 2023/0043741 A1 Feb. 9, 2023

(51) Int. Cl.
*H02M 3/158* (2006.01)
*H02M 1/00* (2006.01)

(52) U.S. Cl.
CPC ......... *H02M 3/158* (2013.01); *H02M 1/0009* (2021.05)

(58) Field of Classification Search
CPC .............................. H02M 1/0009; H02M 3/158
See application file for complete search history.

(56) References Cited

U.S. PATENT DOCUMENTS

| | | | |
|---|---|---|---|
| 6,377,032 B1 | 4/2002 | Andruzzi et al. | |
| 7,868,603 B2 | 1/2011 | Lacombe et al. | |
| 9,602,001 B1 | 3/2017 | Hung et al. | |
| 10,658,931 B1* | 5/2020 | Pant | H02M 3/1584 |
| 2009/0146634 A1* | 6/2009 | Audy | H02M 3/156 |
| | | | 323/290 |
| 2014/0084884 A1 | 3/2014 | Lee | |
| 2018/0083534 A1* | 3/2018 | Pant | H02M 3/158 |
| 2018/0138813 A1* | 5/2018 | Chen | H02M 1/36 |
| 2018/0321702 A1* | 11/2018 | Chen | G05F 3/262 |
| 2020/0014299 A1* | 1/2020 | Sun | H02M 3/1588 |
| 2020/0076306 A1 | 3/2020 | Pullen et al. | |
| 2022/0407417 A1* | 12/2022 | Flaibani | H02M 3/158 |

FOREIGN PATENT DOCUMENTS

JP 2015-119550 A 6/2015

* cited by examiner

*Primary Examiner* — Rafael O De Leon Domenech
(74) *Attorney, Agent, or Firm* — Kowert, Hood, Munyon, Rankin & Goetzel, P.C.; Dean M. Munyon

(57) ABSTRACT

A power converter circuit included in a computer system may employ a compensation loop to adjust the durations of active times during which the power converter circuit sources energy to a load circuit via an inductor. The compensation loop includes an error signal whose value is based on a difference in the output voltage of the power converter circuit from a desired voltage level. During output transients, the error signal is adjusted using an injection current that tracks current flowing through the inductor.

20 Claims, 12 Drawing Sheets

BIAS GENERATION FOR POWER CONVERTER CONTROL

BACKGROUND

Technical Field

This disclosure relates to power management in computer systems and more particularly to voltage regulator circuit operation.

Description of the Related Art

Modern computer systems may include multiple circuit blocks designed to perform various functions. For example, such circuit blocks may include processors, processor cores configured to execute software or program instructions. Additionally, the circuit blocks may include memory circuits, mixed-signal or analog circuits, and the like.

In some computer systems, the circuit blocks may be designed to operate at different power supply voltage levels. Power management circuits may be included in such computer systems to generate and monitor varying power supply voltage levels for the different circuit blocks.

Power management circuits often include one or more power converter circuits configured to generate regulator voltage levels on respective power supply signals using a voltage level of an input power supply signal. Such regulator circuits may employ multiple passive circuit elements such as inductors, capacitors, and the like.

SUMMARY OF THE EMBODIMENTS

Various embodiments for generating a regulated power supply voltage level are disclosed. Broadly speaking, a power converter circuit includes a switch circuit, and a control circuit. The switch circuit is coupled to a regulated power supply node via an inductor and is configured to source a current to the regulated power supply node using an input power supply node. The control circuit is configured to sense a current flowing in the inductor and generate an error signal using a voltage level of the regulated power supply node and a reference voltage. In response to a detection of a change in the voltage level of the regulated power supply node, the control circuit is configured to adjust the error signal using a bias current whose value is based on a voltage level of the input power supply node and the voltage level of the regulated power supply node. The control circuit is also configured to perform a comparison of the current flowing in the inductor and the error signal, and to adjust the operation of the switch circuit using a result of the comparison.

DETAILED DESCRIPTION OF EMBODIMENTS

Figure 1:
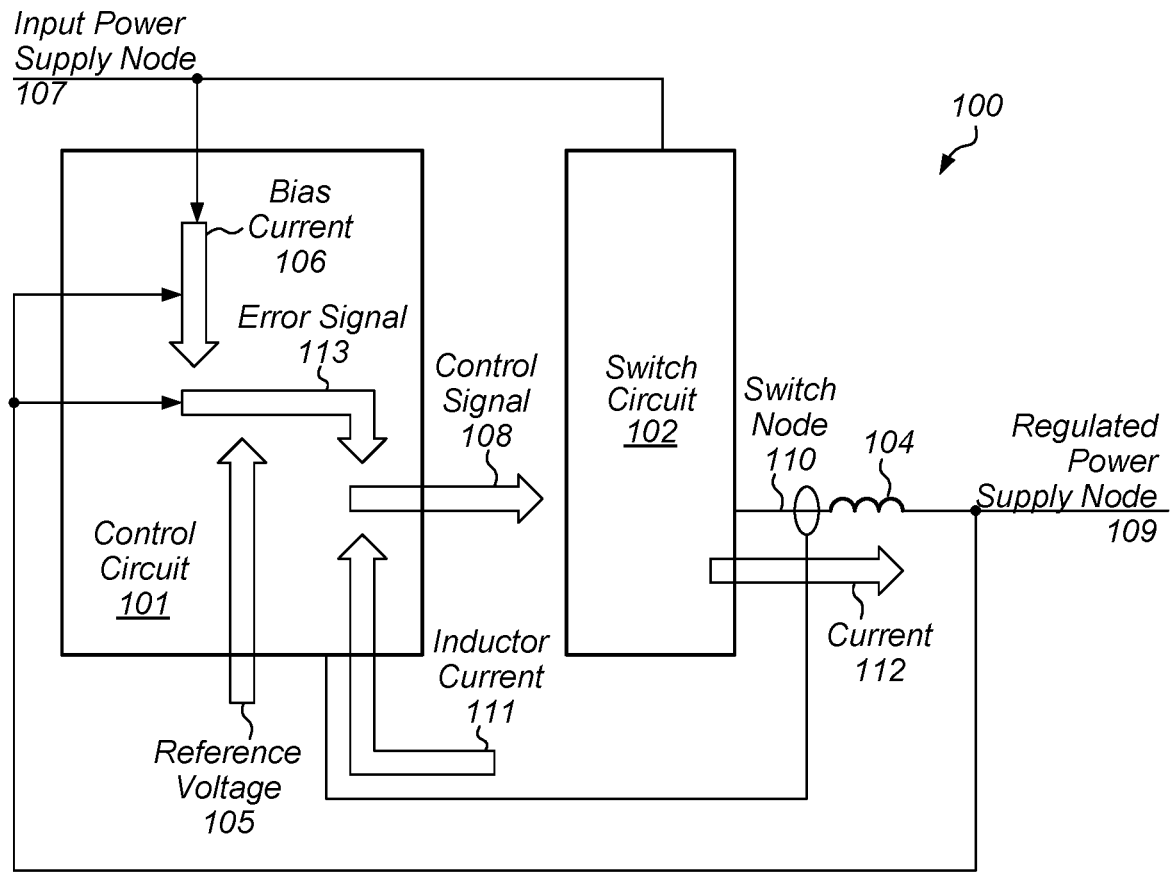
FIG. 1 is a block diagram of an embodiment of a power converter circuit for a computer system.

Computer systems may include multiple circuit blocks configured to perform specific functions. Such circuit blocks may be fabricated on a common substrate and may employ different power supply voltage levels. Power management units (commonly referred to as "PMUs") may include multiple voltage regulator circuits configured to generate regulated voltage levels for various power supply signals. Such voltage regulator circuits may employ both passive circuit elements (e.g., inductors, capacitors, etc.) as well as active circuit elements (e.g., transistors, diodes, etc.).

Different types of voltage regulator circuits may be employed based on power requirements of load circuits, available circuit area, and the like. One type of commonly used voltage regulator circuit is a buck converter circuit. Such converter circuits include multiple switches (also referred to as "power switches") and a switch node that is coupled to a regulated power supply node via an inductor. One switch is coupled between an input power supply node and the switch node and is referred to as the "high-side switch." Another switch is coupled between the switch node and a ground supply node and is referred to as the "low-side switch."

When the high-side switch is closed (referred to as "on-time"), energy is applied to the inductor, resulting in an increase in the current flowing through the inductor. During this time, the inductor stores energy in the form of a magnetic field in a process referred to as "magnetizing" the inductor. When the high-side switch is opened and the low-side switch is closed, energy is no longer being applied to the inductor and the voltage across the inductor reverses, which results in the inductor functioning as a current source with the energy stored in the inductor's magnetic field supporting the current flowing into the load. The process of closing and opening the high-side and low-side switches is performed periodically to maintain a desired voltage level on the power supply node.

Power converter circuits may employ different regulation modes to determine periodicity and duration of on-time and off-times. For example, a power converter circuit may detect a maximum current flowing through its inductor to determine an end of an on-time period. This type of regulation mode is referred to as a "peak-current regulation mode." Alternatively, a power converter circuit may detect a minimum current flowing through its inductor to determine an end of an off-time period. This type of regulation mode is referred to as a "valley-current regulation mode."

Changes in load current demanded from a power converter circuit can result in an undesired change in the voltage level of the regulated power supply node until the power converter circuit can compensate for the increase in load current. Such changes may be the result of changes in operating frequency of load circuits, activation of sleep or power down modes of the load circuits, and the like. For example, an increase in the operating frequency of a load circuit can result in an increase in load current, which can cause a drop in the voltage level of the regulated power supply node.

To improve the response of a power converter circuit during such output transients, a current can be injected into the compensation loop that is combined with an error signal that is based on a difference between the voltage level of the regulated power supply node and a reference voltage. While the injected current can improve the response of the power converter, it can also cause stability issues with the power converter circuit. The embodiments illustrated in the drawings and described below may provide techniques for a power converter to generate an injection current for the compensation loop using a bias current that is based on a difference between a voltage level of an input power supply node and the voltage level of the regulated power supply node, thereby allowing the injection current to more closely track the inductor current to improve stability.

A block diagram depicting an embodiment of a power converter circuit is illustrated in FIG. 1. As illustrated, power converter circuit 100 includes control circuit 101, switch circuit 102, and inductor 104. Switch circuit 102 and inductor 104 are both coupled to switch node 110. Inductor 104 is further coupled to regulated power supply node 109. It is noted that, in some embodiments, inductor 104 may be a planar structure located on a common integrated circuit with control circuit 101 and switch circuit 102. In other embodiments, inductor 104 may be fabricated separately from control circuit 101 and switch circuit 102, and may be located on a separate integrated circuit.

Switch circuit 102 is configured to source, using input power supply node 107, current 112 to regulated power supply node 109 via switch node 110 and inductor 104. As described below, switch circuit 102 may include multiple devices that are configured to couple switch node 110 to input power supply node 107 in order to source current 112.

Control circuit 101 is configured to sense inductor current 111 flowing in inductor 104 and to generate error signal 113 using a voltage level of regulated power supply node 109 and reference voltage 105. In response to a detection of a change in the voltage level of the regulated power supply node 109, control circuit 101 is further configured to adjust error signal 113 using bias current 106, whose value is based on a voltage level of input power supply node 107 and the voltage level of regulated power supply node 109. Control circuit 101 is also configured to perform a comparison of inductor current 111 and error signal 113, and to adjust the operation of the switch circuit 102 using a result of the comparison. In various embodiments, control circuit 101 is configured to generate control signal 108 to adjust the operation of switch circuit 102.

As described below, to adjust error signal 113, control circuit 101 is further configured to generate an injection current based on the voltage level of regulated power supply node 109 and bias current 106, and to combine error signal 113 and the injection current. By combining the injection current and error signal 113, the response of power converter circuit 100 to transients in the voltage level of regulated power supply node 109 may be improved, and by generating the injection current using bias current 106, the injection current can track the inductor current helping to maintain the stability of the compensation loop of power converter circuit 100.

Figure 2:
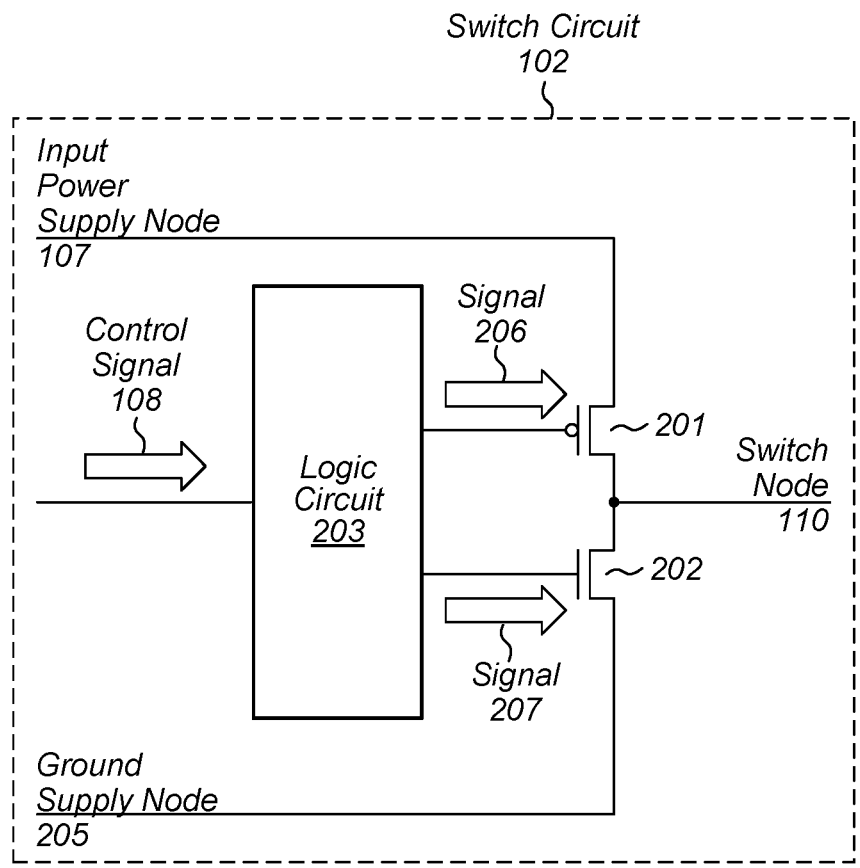
FIG. 2 is a block diagram of an embodiment of a switch circuit included in a power converter circuit.

Turning to FIG. 2, a block diagram of an embodiment of switch circuit 102 is depicted. As illustrated, switch circuit 102 includes devices 201 and 202, and logic circuit 203.

Device 201 is coupled between input power supply node 107 and switch node 110, and is controlled by signal 206. In a similar fashion, device 202 is coupled between switch node 110 and ground supply node 205, and is controlled by signal 207. In various embodiments, device 201 may be implemented as a p-channel metal-oxide semiconductor field-effect transistor (MOSFET), Fin field-effect transistor (FinFET), gate-all-around field-effect transistor (GAAFET), or any other suitable transconductance device. Device 202 may, in other embodiments, be implemented as an n-channel MOSFET, FinFET, GAAFET, or any other suitable transconductance device.

In response to an activation of signal 206, device 201 is configured to couple input power supply node 107 to switch node 110, allowing current to flow into switch node 110 and then into inductor 104, thereby magnetizing inductor 104. In response to an activation of signal 207, device 202 is configured to couple switch node 110 to ground supply node 205. With switch node 110 coupled to ground supply node 205, energy is no longer being supplied to inductor 104, causing the magnetic field of inductor 104 to collapse. As the magnetic field collapses, inductor 104 functions as a current source, providing current to regulated power supply node 109.

Logic circuit 203 is configured to generate signal 206 and signal 207 using control signal 108. In various embodiments, logic circuit 203 may be configured, in response to an activation of control signal 108, to activate signal 206 and deactivate signal 207. Logic circuit 203 may be further configured, in response to a deactivation of control signal 108, to deactivate signal 206 and activate signal 207. In some embodiments, logic circuit 203 may include any suitable combination of logic gates, sequential logic circuit elements, MOSFETs, FinFETs, GAAFETs, or any other suitable transconductance devices.

As used herein, when a signal is activated, it is set to a logic or voltage level that activates a load circuit or device. The logic level may be either a high logic level or a low logic level depending on the load circuit. For example, an active state of a signal coupled to a p-channel MOSFET is a low logic level (referred to as an "active low signal"), while an active state of a signal coupled to an n-channel MOSFET is a high logic level (referred to as an "active high signal").

Figure 3:
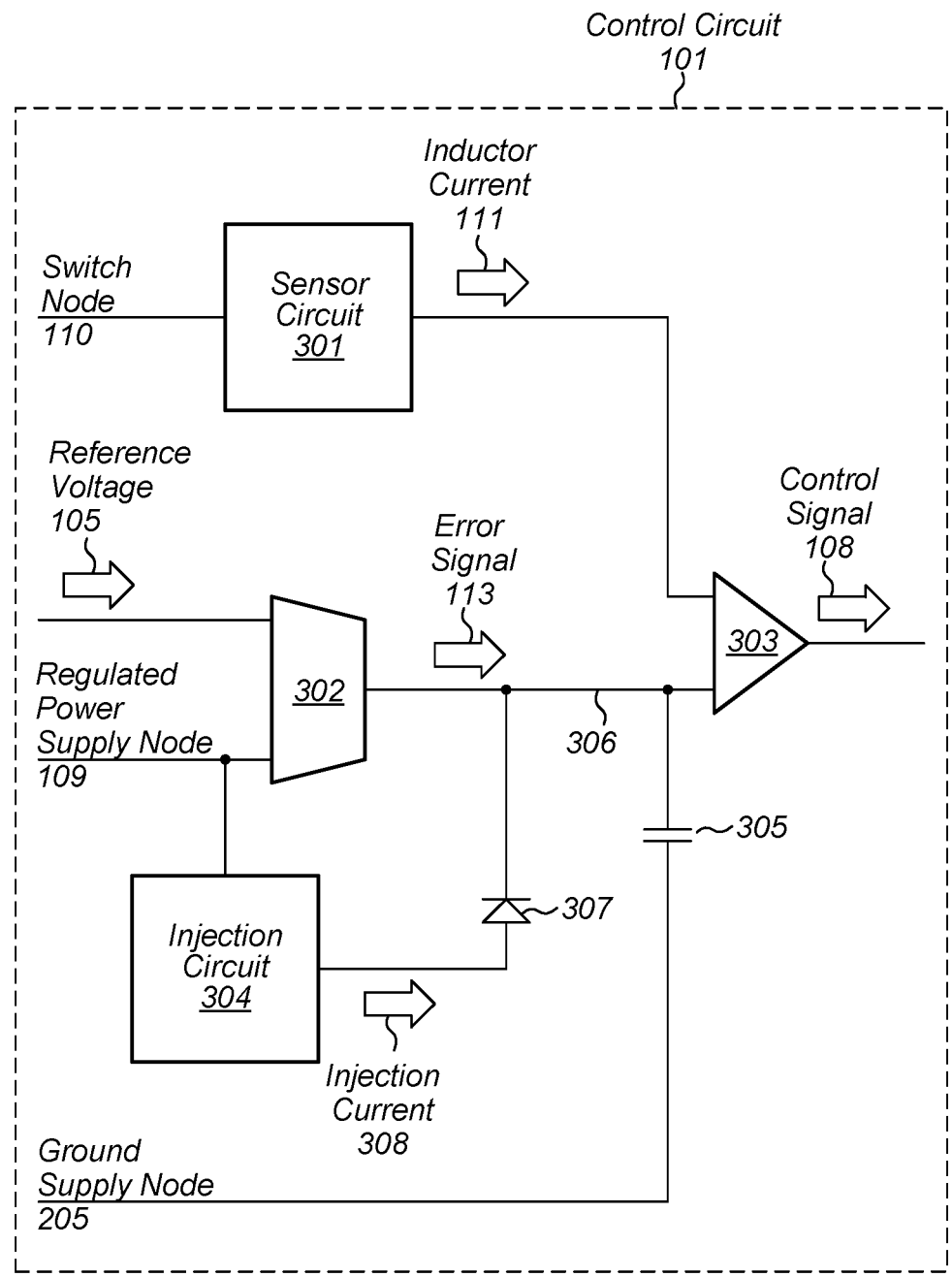
FIG. 3 is a block diagram of an embodiment of a control circuit included in a power converter circuit.

Turning to FIG. 3, a block diagram of an embodiment of control circuit 101 is depicted. As illustrated, control circuit 101 includes sensor circuit 301, comparator circuit 302, comparator circuit 303, injection circuit 304, capacitor 305, and diode 307.

Sensor circuit 301 is coupled to switch node 110 and is configured to generate inductor current 111 using switch node 110. In various embodiments, sensor circuit 301 may include a resistor in series with switch node 110 and inductor 104. To generate inductor current 111, sensor circuit 301 may, in various embodiments, be configured to measure a voltage across the resistor, and convert the voltage across the resistor to inductor current 111. In various embodiments, sensor circuit 301 may be implemented using transconductance amplifier circuits, current mirror circuits, and the like.

Comparator circuit 302 is configured to generate error signal 113 on node 306 using reference voltage 105 and a voltage level of regulated power supply node 109. In various embodiments, error signal 113 may be either a current (referred to as a "demand current") or a voltage. Comparator circuit 302 may, in some embodiments, be configured to generate error signal 113 such that a magnitude of error signal 113 is proportional to a difference between reference voltage 105 and the voltage level of regulated power supply node 109. In various embodiments, comparator circuit 302 may be implemented as an operational transconductance amplifier circuit, a differential amplifier circuit, or any other suitable circuit configured to generate an output signal based on a comparison of at least two input signals.

Comparator circuit 303 is configured to generate control signal 108 using error signal 113 and inductor current 111. In various embodiments, comparator circuit 303 may be configured to activate control signal 108, in response to a determination that error signal 113 is greater than inductor current 111, and de-activate control signal 108 in response to a determination that error signal 113 is less than inductor current 111. Comparator circuit 303 may, in various embodiments, be implemented using a Schmitt trigger circuit, a differential amplifier circuit, or any other suitable combination of circuits configured to generate a digital signal based on a comparison of at least two analog signals.

Injection circuit 304 is configured to source injection current 308 onto node 306 using the voltage level of regulated power supply node 109. As described below, injection circuit 304 is configured to source injection current 308 in response to a determination that the voltage level of regulated power supply node 109 changes by a threshold amount within a particular period of time. By sourcing injection current 308 onto node 306 during such a change in the voltage level of regulated power supply node 109, error signal 113 can be modified to track the change in inductor current 111 resulting from the change in the voltage level of regulated power supply node 109. In various embodiments, the modification of error signal 113 allows power converter circuit 100 to more quickly respond to changes in the voltage level of regulated power supply node 109.

Capacitor 305 is coupled between node 306 and ground supply node 205. In various embodiments, a value of capacitor 305 may be selected based on the respective values of inductor current 111 and error signal 113, and to provide stability to control circuit 101. Capacitor 305 may, in various embodiments, be implemented using a metal-oxide-metal (MOM) structure, a metal-insulator-metal (MIM) structure, or any other suitable capacitor structure available on a semiconductor manufacturing process.

Diode 307 is coupled in series between injection circuit 304 and node 306. In various embodiments, diode 307 is configured to prevent current from flowing back from node 306 into injection circuit 304. Diode 307 may, in various embodiments, be implemented as a diode-connected MOSFET, or any suitable bipolar structure fabricated using a semiconductor manufacturing process.

Figure 4:
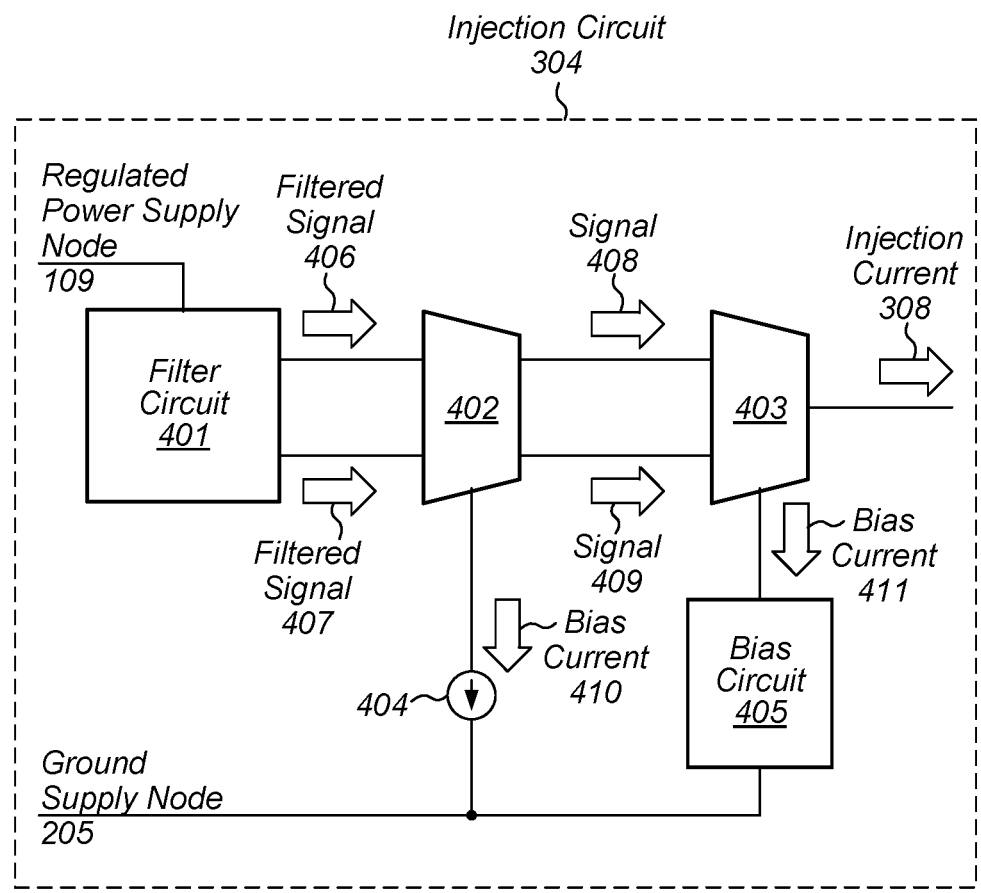
FIG. 4 is a block diagram of an embodiment of an injection circuit for a power converter circuit.

A block diagram of an embodiment of injection circuit 304 is depicted in FIG. 4. As illustrated, injection circuit 304 includes filter circuit 401, amplifier circuit 402, amplifier circuit 403, current source 404, and bias circuit 405.

Filter circuit 401 is configured to generate filtered signals 406 and 407 using a voltage level of regulated power supply node 109. In various embodiments, filter circuit 401 is configured to generate a filtered version of the voltage level of regulated power supply node 109 and to compare the filtered version of the voltage level of regulated power supply node 109 to the voltage level of regulated power supply node 109. In some cases, a difference in the respective magnitudes of filtered signal 406 and filtered signal 407 may encode a magnitude of a drop in the voltage level of regulated power supply node 109.

By comparing the filtered and unfiltered versions of the voltage level of regulated power supply node 109, filter circuit 401 can detect a drop in the voltage level of regulated power supply node 109 that occurs within a particular period of time. By adjusting component values within filter circuit 401, the duration and magnitude of drops in the voltage level of regulated power supply node 109 that can be detected by filter circuit 401 can be modified.

Amplifier circuit 402 is configured to generate signal 408 and signal 409 using filtered signal 406 and filtered signal 407. Bias current 410 may, in some embodiments, set an operating point of amplifier circuit 402. In some embodiments, amplifier circuit 402 may amplify a difference between the respective magnitudes of filtered signal 406 and filtered signal 407 to generate signals 408 and 409. In various embodiments, amplifier circuit 402 may be implemented as an operational transconductance amplifier (OTA) circuit, or other suitable amplifier circuit.

Current source 404 is coupled between amplifier circuit 402 and ground supply node 205, and is configured to generate bias current 410. In various embodiments, current source 404 may be implemented using a voltage-to-current converter circuit that is configured to convert a reference voltage to a corresponding current. The reference voltage may be generated by a temperature and power supply independent bias circuit, and the corresponding current may be scaled up or down to generate bias current 410 using current mirror or other suitable circuits.

Amplifier circuit 403 is configured to generate injection current 308 using signal 408 and signal 409. Bias current 411 may, in various embodiments, set an operating point of amplifier circuit 403 and adjust the slope of injection current 308 during a drop in the voltage level of regulated power supply node 109. As described below, amplifier circuit 403 may be implemented as an OTA circuit.

Bias circuit 405 is coupled between amplifier circuit 403 and ground supply node 205, and is configured to generate bias current 411. As described below, bias circuit 405 may be configured to generate bias current 411 such that a value of bias current 411 is based on a difference between the respective voltage levels of input power supply node 107 and regulated power supply node 109.

Figure 5:
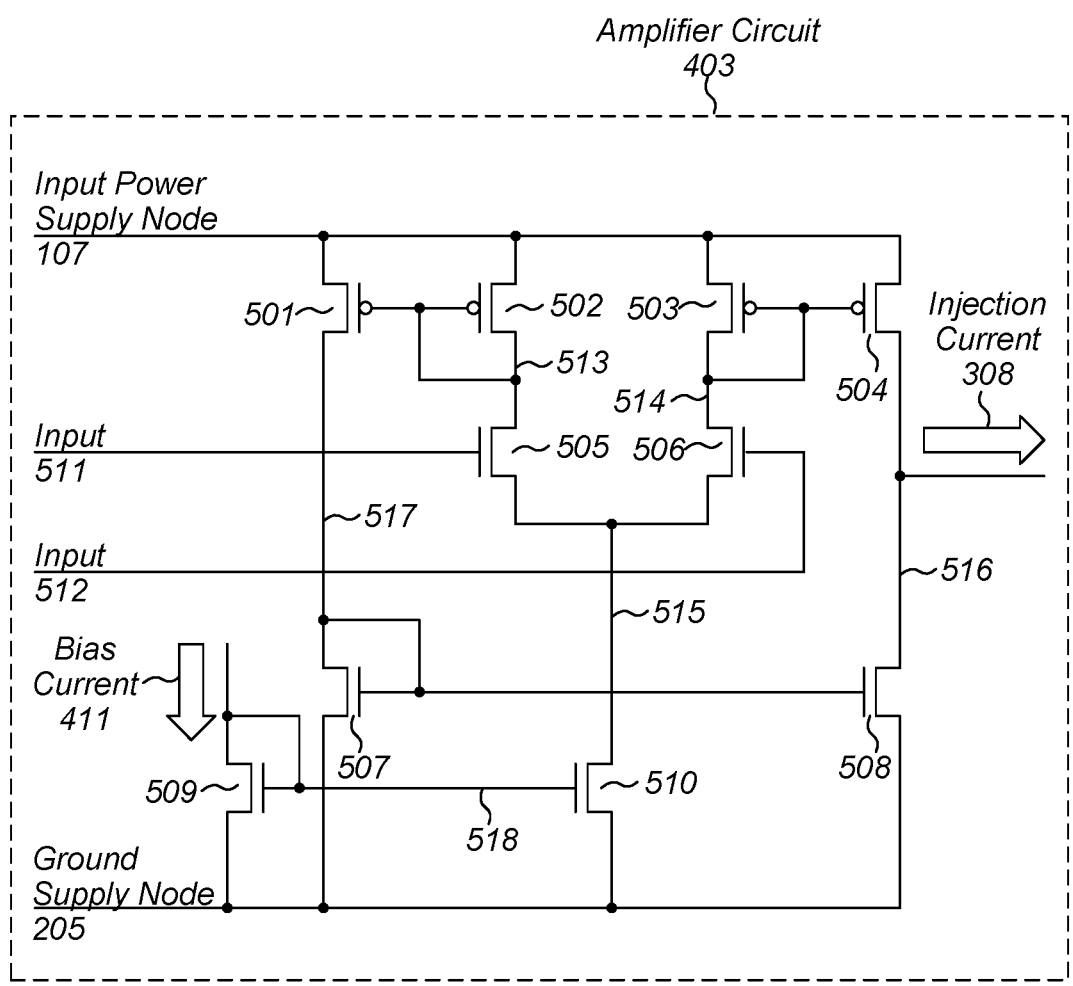
FIG. 5 is a block diagram for an operational transconductance amplifier circuit.

Turning to FIG. 5, a block diagram of an embodiment of amplifier circuit 403 is depicted. As illustrated, amplifier circuit 403 includes devices 501-510. In various embodiments, devices 501-504 may be implemented as p-channel MOSFETs, FinFETS, GAAFETs, or any other suitable transconductance devices, and devices 505-510 may be implemented as n-channel MOSFETs, FinFETs, GAAFETs, or any other suitable transconductance devices.

Device 501 is coupled between input power supply node 107 and node 517, and device 502 is coupled between input power supply node 107 and node 513. Both devices 501 and 502 are controlled by a voltage level of node 513. In various embodiments, devices 501 and 502 form a current mirror circuit configured to generate a current that flows through device 501, which is a replica of a current flowing through device 502.

Device 503 is coupled between input power supply node 107 and node 514, and device 504 is coupled between input power supply node 107 and node 516. Both device 503 and device 504 are controlled by a voltage level of node 514. In various embodiments, devices 503 and 504 form a current mirror circuit configured to generate a current that flows through device 504, which is a replica of a current flowing through device 503.

Device 505 is coupled between nodes 513 and 515, while device 506 is coupled between node 514 and node 515. Device 505 is controlled by a voltage level of input 511, and device 506 is controlled by a voltage level of input 512. It is noted that, in various embodiments, input 511 and input 512 may be coupled to the output of amplifier circuit 402 such that signal 408 and signal 409 propagate on input 511 and input 512, respectively. In various embodiments, devices 505 and 506 form a differential pair, biased by current flowing in node 515, and configured to generate a difference in the voltage levels of node 513 and 514, based on a difference between the respective voltage levels of inputs 511 and 512.

Device 507 is coupled between node 517 and ground supply node 205, while device 508 is coupled between node 516 and ground supply node 205. Both device 507 and device 508 are controlled by a voltage level of node 517. In various embodiments, devices 507 and 508 form a current mirror circuit that is configured to generate a current in device 508 that is a replica of a current in device 507.

Device 510 is coupled between node 515 and ground supply node 205, and is controlled by a voltage level of node 518. Device 509 is coupled between node 518 and ground supply node 205, and is controlled by a voltage level of node 518. In various embodiments, devices 509 and 510 form a current mirror circuit, which is configured to generate a current in device 510 that is a replica of bias current 411. The current in device 510 sets a bias point of the differential amplifier circuit formed by devices 505 and 506.

As signals 408 and 409 change due to a drop in the voltage level of regulated power supply node 109, the differential amplifier circuit formed by device 505 and 506 generates a difference in the voltage levels of nodes 513 and 514 that is proportional to the difference between signals 408 and 409. The difference between the voltage levels of nodes 513 and 514 results in different currents flowing in devices 502 and 503, which are then replicated in devices 501 and 504. The current flowing in device 501 additionally flows through device 507 and is replicated in device 508 by the current mirror circuit formed by devices 507 and 508. The combination of the current in devices 504 and 508 on node 516 generates injection current 308. Since the current in devices 504 and 508 is based on the differential amplifier circuit formed by devices 505 and 506, which is biased using bias current 411, the slope of injection current 308 is limited by bias current 411 and, therefore, the difference in the respective voltage levels of input power supply node 107 and regulated power supply node 109.

Figure 6:
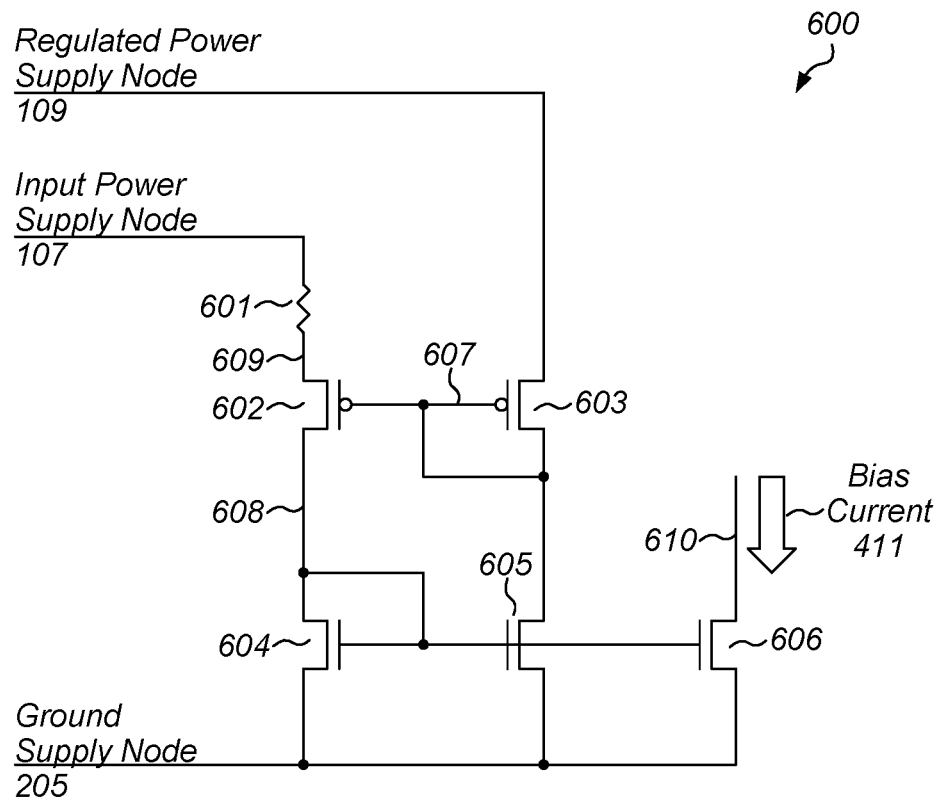
FIG. 6 is a block diagram of an embodiment of a bias generator circuit.

Turning to FIG. 6, a block diagram of an embodiment of a bias circuit is depicted. As illustrated, bias circuit 600 includes resistor 601, and devices 602-606. In various embodiments, bias circuit 600 may correspond to bias circuit 405 as illustrated in FIG. 4.

Resistor 601 is coupled between input power supply node 107 and device 602. In various embodiments, resistor 601 may be implemented using polysilicon, metal, or any other suitable material available on a semiconductor manufacturing process. It is noted that in some embodiments, a value of resistor 601 may be programmable during operation, or may be trimmed post manufacture.

Device 602 is coupled between resistor 601 and node 608, and is controlled by the voltage level of node 607, while device 603 is coupled between regulated power supply node 109 and node 607, and is controlled by the voltage level of node 607. In various embodiments, devices 602 and 603 form a current mirror circuit. Devices 602 and 603 may be implemented as p-channel MOSFETs, FinFETs, GAAFETs, or any other suitable transconductance device.

Device 604 is coupled between node 608 and ground supply node 205, and is controlled by the voltage level of node 608. Device 605 is coupled between node 607 and ground supply node 205, while device 606 is coupled between node 610 and ground supply node 205. Both device 605 and 606 are also controlled by the voltage level of node 608. In various embodiments, devices 604 and 605 form a second current mirror circuit configured to replicate a current flowing in device 604 to flow in devices 605 and 606. It is noted that by changing physical properties (e.g., device width) of devices 605 and 606, the replicated currents can be scaled in value relative to the current flowing in device 604. Devices 604-606 may be implemented as n-channel MOSFETs, FinFETs, GAAFETs, or any other suitable transconductance device.

During operation, the current mirror circuit formed by devices 602 and 603, force the voltage of node 609 to be that of regulated power supply node 109. This results in the value of a current flowing through resistor 601 and device 602 to be proportional to a difference between the voltage level of input power supply node 107 and the voltage level of regulated power supply node 109, with the constant of proportionality being the value of resistor 601. In various embodiments, the value of resistor 601 is selected based on voltage ranges of input power supply node 107 and regulated power supply node 109, as well as a desired operating point of amplifier circuit 403.

The current flowing through device 602 also flows through device 604. The current mirror formed by devices 604-606 replicates the current flowing through device 604 into a current flowing through device 605 and into bias current 411 flowing through device 606. The value of bias current 411 can be scaled by adjusting the physical properties of device 606 relative to the physical properties of device 604. In the case where the physical properties of devices 604 and 606 are the same, i.e., the devices have matched electrical characteristics, the value of bias current 411 will be a difference between the voltage levels of input power supply node 107 and regulated power supply node 109, divided by the value of resistor 601. By generating bias current 411 in such a fashion, injection current 308 is limited by the difference between the voltage levels of input power supply node 107 and regulated power supply node 109, thereby causing injection current 308 to track the slope of inductor current 111.

Figure 7:
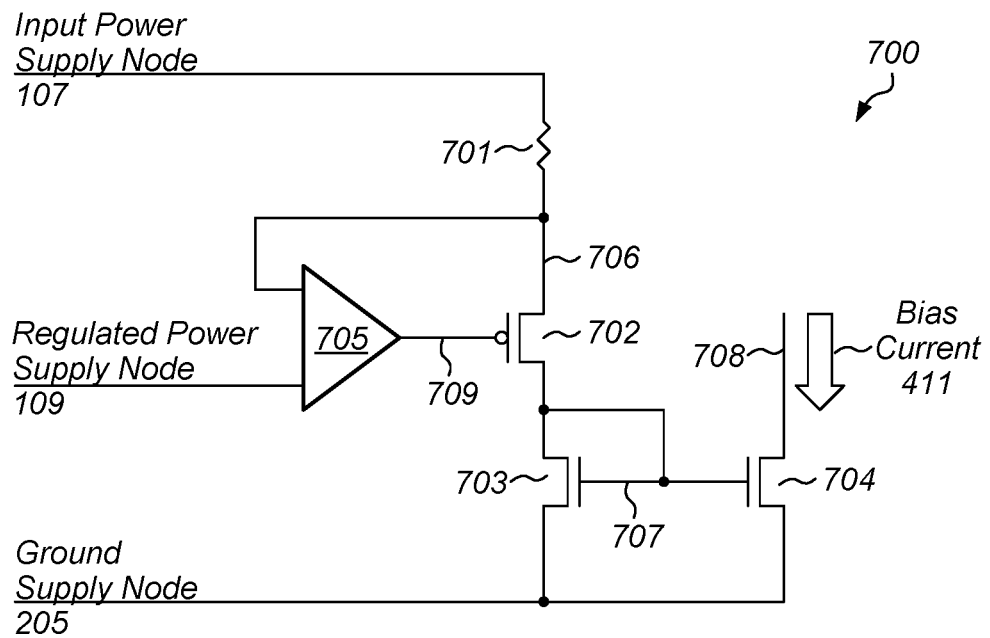
FIG. 7 is a block diagram of another embodiment of a bias generator circuit.

Another embodiment of a bias circuit is depicted in FIG. 7. As illustrated, bias circuit 700 includes resistor 701, devices 702-704, and comparator 705. In various embodiments, bias circuit 700 may correspond to bias circuit 405 as depicted in the embodiment of FIG. 4.

Resistor 701 is coupled between input power supply node 107 and node 706. Device 702 is coupled between node 706 and node 707, and is controlled by a voltage level of node 709. Device 703 is coupled between node 707 and ground supply node 205, while device 704 is coupled between node 708 and ground supply node 205. Both device 703 and device 704 are controlled by a voltage level of node 707. In various embodiments, resistor 701 may be implemented using polysilicon, metal, or any other suitable material available on a semiconductor manufacturing process. Device 702 may be implemented as a p-channel MOSFET, FinFET, GAAFET, or any other suitable transconductance device, while devices 703 and 704 may be implemented as n-channel MOSFETs, FinFETs, GAAFETs, or any other suitable transconductance devices.

Comparator 705 is configured to generate a voltage level on node 709 based on a comparison of the respective voltage levels of node 706 and regulated power supply node 109. In some cases, comparator 705 may be configured to generate the voltage level on node 709 such that the voltage level on node 709 is proportional to a difference between the respective voltage levels of input power supply node 107 and regulated power supply node 109. In various embodiments, comparator 705 may be implemented as a differential amplifier circuit, or any other suitable comparator circuit configured to generate an output voltage based on a comparison of two input voltage levels.

The voltage level of node 709 controls the conductance of device 702, allowing different amounts of current to flow from node 706 to node 707. As current flows from input power supply node 107 through resistor 701 and into node 706, a voltage is generated across resistor 701 that is proportional to the value of resistor 701. Comparator 705 adjust the voltage level of node 709 until the voltage level of node 706 is within a threshold value of the voltage level of regulated power supply node 109. The threshold value may, in some embodiments, correspond to an offset in comparator 705, and can be on the order of tens of microvolts.

When the voltage level of node 706 is within the threshold value of the voltage level of regulated power supply node 109, the current flowing through resistor 701 is proportional to the difference between the voltage level of input power supply node 107 and the voltage level of regulated power supply node 109. The current flowing through resistor 701 also flows through device 702 and device 703, which forms a current mirror circuit with device 704. The current mirror circuit generates bias current 411 flowing in device 704 that is a replica of the current flowing through device 703. It is noted that by modifying the ratio of the transconductances of devices 703 and 704, bias current 411 may be scaled up or down relative to the current flowing through device 703.

Since bias current 411 is a replica of the current in device 703, it is also proportional to the difference between the respective voltage levels of input power supply node 107 and regulated power supply node 109, when is it used to bias amplifier circuit 403, injection current 308 is limited by the difference between the voltage levels of input power supply node 107 and regulated power supply node 109, thereby causing injection current 308 to track the slope of inductor current 111.

Figure 8:
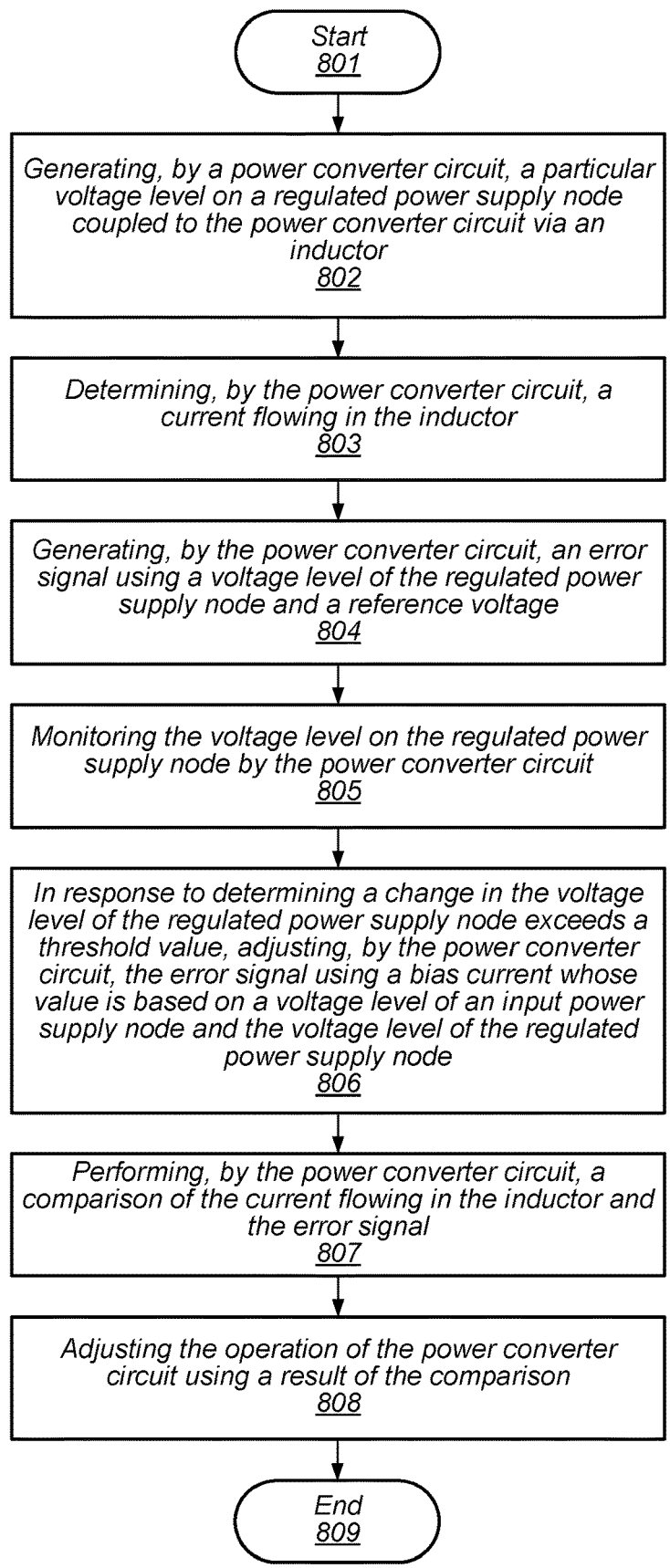
FIG. 8 is a flow diagram of an embodiment of a method for operating a power converter circuit.

Turning to FIG. 8, a flow diagram depicting an embodiment of a method for operating a power converter circuit is illustrated. The method, which may be applied to power converter circuit 100, begins in block 801.

The method includes generating, by a power converter circuit, a particular voltage level on a regulated power supply node coupled to the power converter circuit via an inductor (block 802). In various embodiments, the power converter circuit may employ one of various control techniques (e.g., peak-current regulation) to maintain the particular voltage level on the regulated power supply node.

The method also includes determining, by the power converter circuit, a current flowing in the inductor (block 803). In various embodiments, determining the current flowing in the inductor includes sensing a voltage across a resistor that is coupled between the power converter circuit and the inductor. It is noted that using a resistor is one technique for determining the inductor current and that, in other embodiments, different sensing techniques for the inductor current may be employed.

The method further includes generating, by the power converter circuit, an error signal using a voltage level of the regulated power supply node and a reference voltage (block 804). In various embodiments, generating the error signal includes comparing the voltage level of the regulated power supply node to the reference voltage. In some cases, the error signal includes a current whose value is proportional to the difference between the voltage level of the regulated power supply node and the reference voltage.

The method also includes monitoring the voltage level of the regulated power supply node (block 805). In various embodiments, monitoring the voltage level of the regulated power supply node includes filtering the voltage level of the regulated power supply node to generate a first filtered signal and a second filtered signal.

The method further includes, in response to determining a change in the voltage level of the regulated power supply node that exceeds a threshold value, adjusting, by the power converter circuit, the error signal using a bias current whose value is based on a voltage level of an input power supply node and the voltage level of the regulated power supply node (block 806). In various embodiments, adjusting the error signal includes generating an injection current based on a voltage level of the regulated power supply node and using the bias current, and combining the error signal and the injection current. In some cases, generating the injection current includes amplifying a difference between the first filtered signal and the second filtered signal to generate a first amplified signal and a second filtered signal, and amplifying, using the bias current, the first amplified signal and the second amplified signal to generate the injection current.

In various embodiments, the method may include generating an initial current using the voltage level of the input power supply node and a transconductance device coupled in series with the input power supply node, adjusting the conductance of the transconductance device based on a comparison of the voltage level of the regulated power supply node and a voltage level at a terminal of the transconductance device, and replicating, by a current mirror circuit, the initial current to generate the bias current. In other embodiments, the method may include generating, by a first current mirror circuit, a voltage across a resistor, wherein a value of the voltage is based on a difference between the voltage level of the input power supply node and replicating, by a second current mirror circuit, a current flowing in the resistor to generate the bias current.

The method also includes performing, by the power converter circuit, a comparison of the current flowing in the inductor and the error signal (block 807). The method further includes adjusting the operation of the power converter circuit using a result of the comparison (block 808). In various embodiments, adjusting the operation of the power converter circuit includes halting an on-time of a switch circuit included in the power converter circuit using the results of the comparison. The method concludes in block 809.

Figure 9:
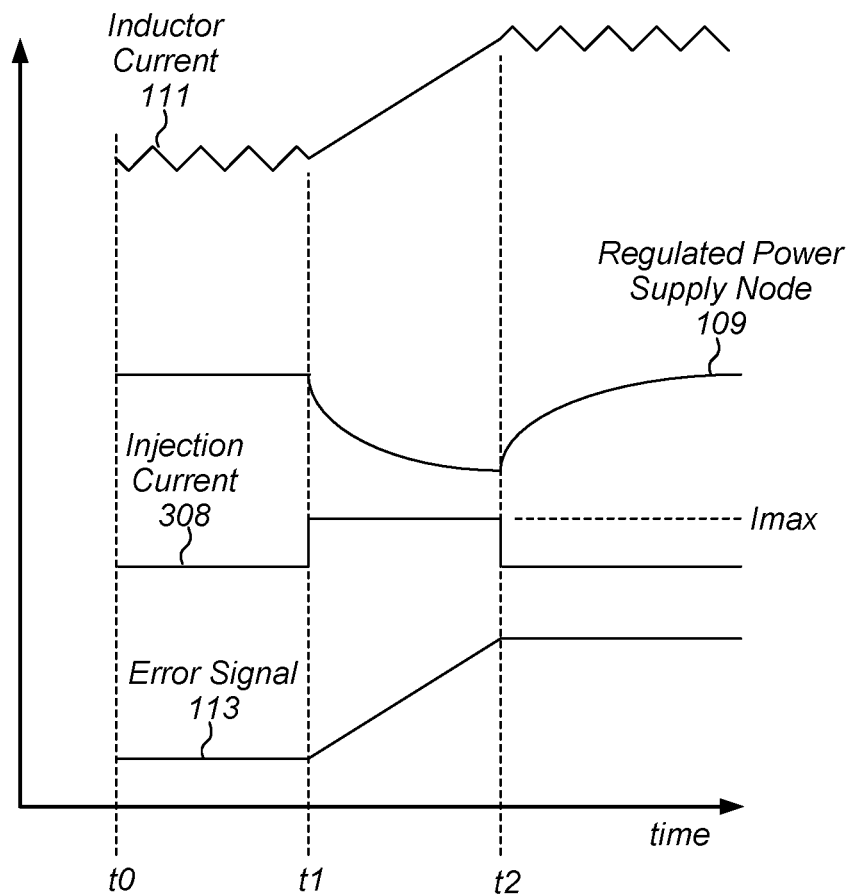
FIG. 9 illustrates example waveforms of a power converter during an output voltage transient.

Turning to FIG. 9, example waveforms associated with the operation of power converter circuit 100 are depicted. It is noted that the waveforms illustrated in FIG. 9 are merely examples and that, in different embodiments, the magnitude and timing for the waveforms may vary.

At time t0, power converter circuit 100 is maintaining the voltage level of regulated power supply node 109 by toggling between on-times and off-times, where inductor 104 is magnetized and de-magnetized, respectively. The transitions between the various on-times and off-times produce a characteristic ripple in inductor current 111 as inductor 104 is magnetized and de-magnetized. Depending on a type of regulation mode being employed (e.g., peak-current regulation), the duration of either the on-times or off-times are determined by a comparison of inductor current 111 to error signal 113. For example, in peak-current regulation mode, a given on-time is halted when the value of inductor current 111 becomes greater than the value of error signal 113. It is noted that the peak value of inductor current 111, the minimum (or "valley") value of inductor current 111, or an average of the peak and valley values of inductor current 111 can be used in the regulation process.

At time t1, the voltage level of regulated power supply node 109 begins to drop, and continues to drop until time t2. In various embodiments, the drop in the voltage level of regulated power supply node 109 may be the result of additional load current being drawn from regulated power supply node 109. The additional load current may be the result of an increase in operating frequency of load circuits, load circuits exiting a sleep or power down mode, and the like.

When power converter circuit 100 detects the drop in the voltage level of regulated power supply node 109, injection circuit 304 begins sourcing injection current 308 onto node 306 increasing the value of error signal 113. The increase the value of error signal 113 allows the value of inductor current 111 to increase during the period from time t1 to the time t2, to allow power converter circuit 100 to more quickly recover from the change in the voltage level of regulated power supply node 109. As described above, the maximum value of injection current 308 (denoted as "Imax") is proportional to the difference between the voltage level of input power supply node 107 and the voltage level of regulated power supply node 109.

At time t2, the voltage of regulated power supply node 109 begins to rise, which halts the increase in error signal 113 and, therefore, the increase in inductor current 111. As the increase in inductor current 111 comes to a halt, regulation continues with inductor current 111 showing the characteristic ripple associated with the on-times and off-times of power converter circuit 100.

It is noted that although the waveforms of FIG. 9 and the operation of power converter circuit 100 are described in the context of a drop in the voltage level of regulated power supply node 109, similar circuit techniques can be used to adjust the error signal 113 in the event of increases in the voltage level of regulated power supply node 109.

Figure 10:
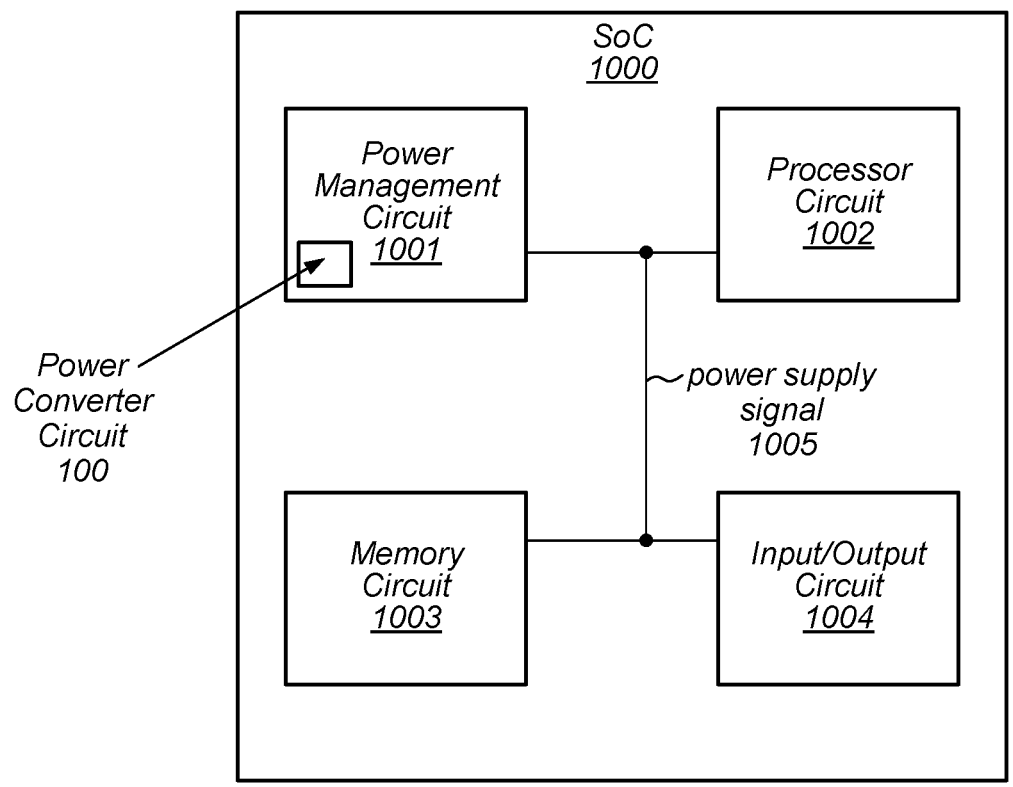
FIG. 10 is a block diagram of one embodiment of a system-on-a-chip that includes a power management circuit.

A block diagram of a system-on-a-chip (SoC) is illustrated in FIG. 10. In the illustrated embodiment, SoC 1000 includes power management unit 1001, processor circuit 1002, input/output circuits 1004, and memory circuit 1003, each of which is coupled to power supply signal 1005. In various embodiments, SoC 1000 may be configured for use in a desktop computer, server, or in a mobile computing application such as, e.g., a tablet, laptop computer, or wearable computing device.

Power management unit 1001 includes power converter circuit 100 which is configured to generate a regulated voltage level on power supply signal 1005 in order to provide power to processor circuit 1002, input/output circuits 1004, and memory circuit 1003. Although power management unit 1001 is depicted as including a single power converter circuit, in other embodiments, any suitable number of power converter circuits may be included in power management unit 1001, each configured to generate a regulated voltage level on a respective one of multiple internal power supply signals included in SoC 1000.

Processor circuit 1002 may, in various embodiments, be representative of a general-purpose processor that performs computational operations. For example, processor circuit 1002 may be a central processing unit (CPU) such as a microprocessor, a microcontroller, an application-specific integrated circuit (ASIC), or a field-programmable gate array (FPGA).

Memory circuit 1003 may in various embodiments, include any suitable type of memory such as a Dynamic Random-Access Memory (DRAM), a Static Random-Access Memory (SRAM), a Read-Only Memory (ROM), Electrically Erasable Programmable Read-only Memory (EEPROM), or a non-volatile memory, for example. It is noted that although a single memory circuit is illustrated in FIG. 10, in other embodiments, any suitable number of memory circuits may be employed.

Input/output circuits 1004 may be configured to coordinate data transfer between SoC 1000 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1004 may be configured to implement a version of Universal Serial Bus (USB) protocol or IEEE 1394 (Firewire®) protocol.

Input/output circuits 1004 may also be configured to coordinate data transfer between SoC 1000 and one or more devices (e.g., other computing systems or integrated circuits) coupled to SoC 1000 via a network. In one embodiment, input/output circuits 1004 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1004 may be configured to implement multiple discrete network interface ports.

Figure 11:
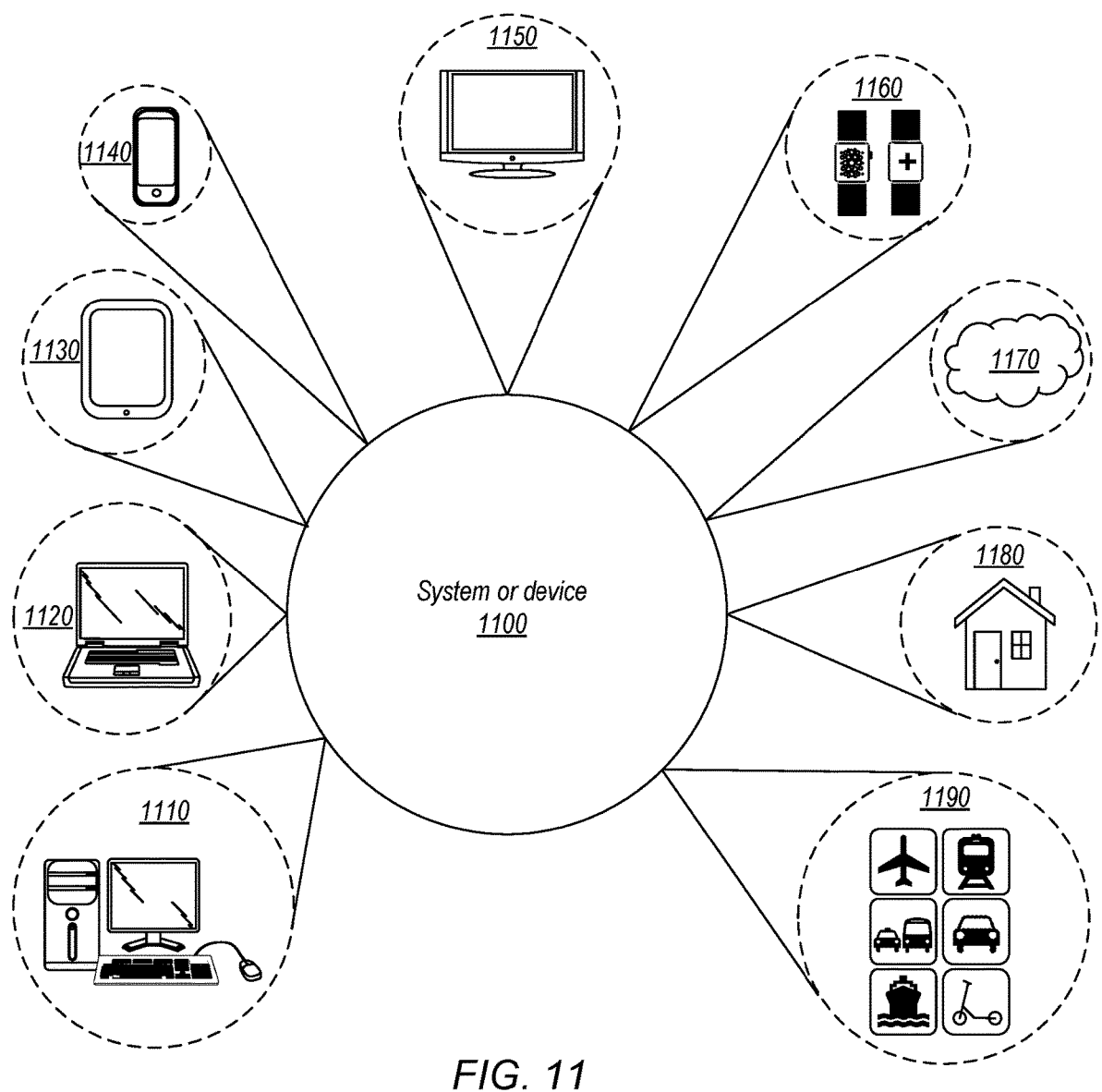
FIG. 11 is a block diagram of various embodiments of computer systems that may include power converter circuits.

Turning now to FIG. 11, various types of systems that may include any of the circuits, devices, or systems discussed above are illustrated. System or device 1100, which may incorporate or otherwise utilize one or more of the techniques described herein, may be utilized in a wide range of areas. For example, system or device 1100 may be utilized as part of the hardware of systems such as a desktop computer 1110, laptop computer 1120, tablet computer 1130, cellular or mobile phone 1140, or television 1150 (or set-top box coupled to a television).

Similarly, disclosed elements may be utilized in a wearable device 1160, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1100 may also be used in various other contexts. For example, system or device 1100 may be utilized in the context of a server computer system, such as a dedicated server or on shared hardware that implements a cloud-based service 1170. Still further, system or device 1100 may be implemented in a wide range of specialized everyday devices, including devices 1180 commonly found in the home such as refrigerators, thermostats, security cameras, etc. The interconnection of such devices is often referred to as the "Internet of Things" (IoT). Elements may also be implemented in various modes of transportation. For example, system or device 1100 could be employed in the control systems, guidance systems, entertainment systems, etc. of various types of vehicles 1190.

The applications illustrated in FIG. 11 are merely exemplary and are not intended to limit the potential future applications of disclosed systems or devices. Other example applications include, without limitation: portable gaming devices, music players, data storage devices, unmanned aerial vehicles, etc.

Figure 12:
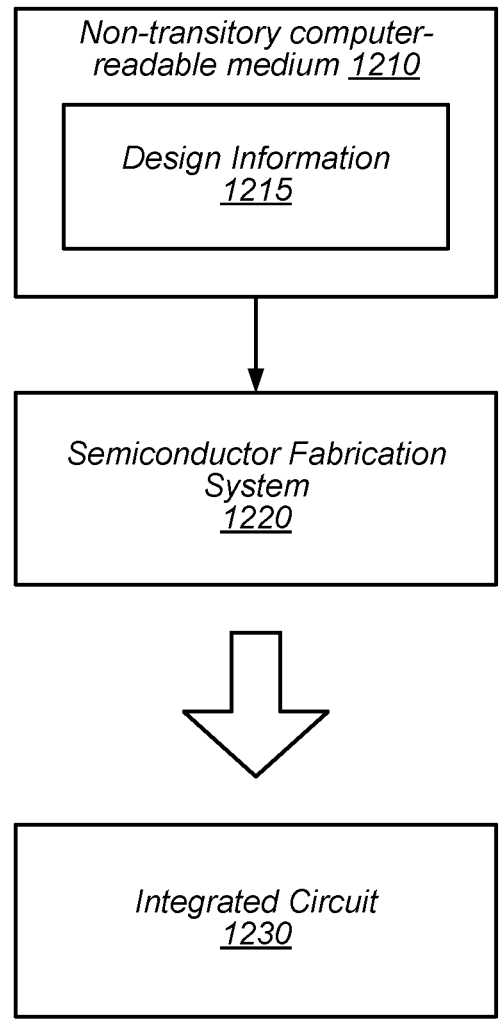
FIG. 12 illustrates an example of a non-transitory computer-readable storage medium that stores circuit design information.

FIG. 12 is a block diagram illustrating an example of a non-transitory computer-readable storage medium that stores circuit design information, according to some embodiments. In the illustrated embodiment, semiconductor fabrication system 1220 is configured to process design information 1215 stored on non-transitory computer-readable storage medium 1210 and fabricate integrated circuit 1230 based on design information 1215.

Non-transitory computer-readable storage medium 1210, may comprise any of various appropriate types of memory devices or storage devices. Non-transitory computer-readable storage medium 1210 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as Flash, magnetic media, e.g., a hard drive, or optical storage; registers, or other similar types of memory elements, etc. Non-transitory computer-readable storage medium 1210 may include other types of non-transitory memory as well or combinations thereof. Non-transitory computer-readable storage medium 1210 may include two or more memory mediums, which may reside in different locations, e.g., in different computer systems that are connected over a network.

Design information 1215 may be specified using any of various appropriate computer languages, including hardware description languages such as, without limitation: VHDL, Verilog, SystemC, SystemVerilog, RHDL, M, MyHDL, etc. Design information 1215 may be usable by semiconductor fabrication system 1220 to fabricate at least a portion of integrated circuit 1230. The format of design information 1215 may be recognized by at least one semiconductor fabrication system, such as semiconductor fabrication system 1220, for example. In some embodiments, design information 1215 may include a netlist that specifies elements of a cell library, as well as their connectivity. One or more cell libraries used during logic synthesis of circuits included in integrated circuit 1230 may also be included in design information 1215. Such cell libraries may include information indicative of device or transistor level netlists, mask design data, characterization data, and the like, of cells included in the cell library.

Integrated circuit 1230 may, in various embodiments, include one or more custom macrocells, such as memories, analog or mixed-signal circuits, and the like. In such cases, design information 1215 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 1220 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 1220 may also be configured to perform various testing of fabricated circuits for correct operation.

In various embodiments, integrated circuit 1230 is configured to operate according to a circuit design specified by design information 1215, which may include performing any of the functionality described herein. For example, integrated circuit 1230 may include any of various elements shown or described herein. Further, integrated circuit 1230 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the other hand, a phrase such as "either x or y, but not both" makes clear that "or" is being used in the exclusive sense.

A recitation of "w, x, y, or z, or any combination thereof" or "at least one of w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
   a switch circuit coupled to a regulated power supply node via an inductor, wherein the switch circuit is configured to source, using an input power supply node, current to the regulated power supply node; and
   a control circuit configured to:
   sense a current flowing in the inductor;
   generate an error signal using a voltage level of the regulated power supply node and a reference voltage;
   filter a voltage level of the regulated power supply node to generate a first filtered signal and a second filtered signal;
   in response to a detection of a change in the voltage level of the regulated power supply node;
   amplify a difference between the first filtered signal and the second filtered signal to generate a first amplified signal and a second amplified signal;
   amplify, using a bias current, the first amplified signal and the second amplified signal to generate an injection current, wherein a value of the bias current whose value is based on a voltage level of the input power supply node and the voltage level of the regulated power supply node; and
   combine the injection current into the error signal;
   perform a comparison of the current flowing in the inductor and the error signal; and
   adjust operation of the switch circuit using a result of the comparison.

2. The apparatus of claim 1, wherein the control circuit is further configured to:

generate an initial current using the voltage level of the input power supply node and a transconductance device coupled in series with the input power supply node; and adjust a conductance of the transconductance device based on a comparison of the voltage level of the regulated power supply node and a voltage level at a terminal of the transconductance device; and wherein the control circuit includes a current mirror circuit configured to replicate the initial current to generate the bias current.

3. The apparatus of claim 2, wherein the transconductance device is coupled to the input power supply node via a resistor.

4. The apparatus of claim 1, wherein the control circuit includes a first current mirror circuit and a second current mirror circuit, wherein the first current mirror circuit is configured to generate a voltage across a resistor, wherein a value of the voltage is based on a difference between the voltage level of the input power supply node and the regulated power supply node, and wherein the second current mirror circuit is configured to replicate a current flowing in the resistor to generate the bias current.

5. The apparatus of claim 4, wherein the resistor is coupled between the input power supply node and a first device of the first current mirror circuit.

6. The apparatus of claim 1, wherein the control circuit includes a resistor coupled between the switch circuit and the inductor, and wherein the control circuit is further configured to sense a voltage across the resistor.

7. A method, comprising:
generating, by a power converter circuit, a particular voltage level on a regulated power supply node coupled to the power converter circuit via an inductor;
determining, by the power converter circuit, a current flowing in the inductor;
generating an error signal using a voltage level of the regulated power supply node and a reference voltage;
monitoring a voltage level generated on the regulated power supply node by the power converter circuit;
in response to determining a change in the voltage level of the regulated power supply node exceeds a threshold value;
filtering a voltage level of the regulated power supply node to generate a first filtered signal and a second filtered signal;
amplifying a difference between the first filtered signal and the second filtered signal to generate a first amplified signal and a second amplified signal;
amplifying, using a bias current, the first amplified signal and the second amplified signal to generate an injection current, wherein a value of the bias current is based a voltage level of an input power supply node and the voltage level of the regulated power supply node; and
combining the injection current into the error signal;
performing, by the power converter circuit, a comparison of the current flowing in the inductor and the error signal; and
adjusting operation of the power converter circuit using a result of the comparison.

8. The method of claim 7, further comprising:
generating an initial current using the voltage level of the input power supply node and a transconductance device coupled in series with the input power supply node; and
adjusting a conductance of the transconductance device based on a comparison of the voltage level of the regulated power supply node and a voltage level at a terminal of the transconductance device; and
replicating, by a current mirror circuit, the initial current to generate the bias current.

9. The method of claim 8, wherein the transconductance device is coupled to the input power supply node via a resistor.

10. The method of claim 7, further comprising
generating, by a first current mirror circuit, a voltage across a resistor, wherein a value of the voltage is based on a difference between the voltage level of the input power supply node and the voltage level of the regulated power supply node; and
replicating, by a second current mirror circuit, a current flowing in the resistor to generate the bias current.

11. The method of claim 10, wherein the resistor is coupled between the input power supply node and a first device of the first current mirror circuit.

12. The method of claim 7, wherein determining the current flowing in the inductor includes sensing a voltage across a resistor that is coupled between the power converter circuit and the inductor.

13. The method of claim 7, wherein adjusting the operation of the power converter circuit using the result of the comparison includes halting an on-time of a switch circuit included in the power converter circuit using the result of the comparison.

14. An apparatus, comprising:
a plurality of load circuits coupled to a regulated power supply node; and
a power converter circuit coupled to the regulated power supply node via an inductor, wherein the power converter circuit is configured to:
generate a particular voltage level on the regulated power supply node;
determine a current flowing in the inductor;
generate an error signal using a voltage level of the regulated power supply node and a reference voltage;
filter the voltage level of the regulated power supply node to generate a first filtered signal and a second filtered signal;
in response to determining a change in the voltage level of the regulated power supply node exceeds a threshold value;
amplify a difference between the first filtered signal and the second filtered signal to generate a first amplified signal and a second amplified signal;
amplify, using a bias current, the first amplified signal and the second amplified signal to generate an injection current, wherein a value of the bias current is based a voltage level of an input power supply node and the voltage level of the regulated power supply node; and
combine the injection current into the error signal;
perform a comparison of the current flowing in the inductor and the error signal; and
adjust regulation of the regulated power supply node using a result of the comparison.

15. The apparatus of claim 14, wherein the power converter circuit is further configured to:
generate an initial current using the voltage level of the input power supply node and a transconductance device coupled in series with the input power supply node; and
adjust a conductance of the transconductance device based on a comparison of the voltage level of the regulated power supply node and a voltage level at a terminal of the transconductance device; and replicate the initial current to generate the bias current.

16. The apparatus of claim 15, wherein the transconductance device is coupled to the input power supply node via a resistor.

17. The apparatus of claim 14, wherein the power converter circuit includes a first current mirror circuit and a second current mirror circuit, wherein the first current mirror circuit is configured to generate a voltage across a resistor, wherein a value of the voltage is based on a difference between the voltage level of the input power supply node and the voltage level of the regulated power supply node, and wherein the second current mirror circuit is configured to replicate a current flowing in the resistor to generate the bias current.

18. The apparatus of claim 17, wherein the resistor is coupled between the input power supply node and a first device of the first current mirror circuit.

19. The apparatus of claim 14, wherein to determine the current flowing in the inductor, the power converter circuit is further configured to sense a voltage across a resistor that is coupled between the power converter circuit and the inductor.

20. The apparatus of claim 14, wherein to adjust the regulation of the regulated power supply node, the power converter circuit is further configured to halt an on-time of a switch circuit included in the power converter circuit using the result of the comparison.

\* \* \* \* \*

UNITED STATES PATENT AND TRADEMARK OFFICE
CERTIFICATE OF CORRECTION

PATENT NO. : 11,837,955 B2
APPLICATION NO. : 17/397781
DATED : December 5, 2023
INVENTOR(S) : Nikola Jovanovic et al.

It is certified that error appears in the above-identified patent and that said Letters Patent is hereby corrected as shown below:

In the Claims

Column 16, Line 58, delete "whose value".

Signed and Sealed this
Sixth Day of February, 2024

*Katherine Kelly Vidal*

Katherine Kelly Vidal
*Director of the United States Patent and Trademark Office*